United States Patent
Jing et al.

(10) Patent No.: US 9,726,293 B2
(45) Date of Patent: Aug. 8, 2017

(54) EMERGENCY SHUT-OFF VALVE

(71) Applicant: EMERSON PROCESS MANAGEMENT REGULATOR TECHNOLOGIES, INC., McKinney, TX (US)

(72) Inventors: Chen Jing, Shanghai (CN); Ji Feifei, Shanghai (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/685,186

(22) Filed: Apr. 13, 2015

(65) Prior Publication Data

US 2015/0292626 A1 Oct. 15, 2015

(30) Foreign Application Priority Data

Apr. 14, 2014 (CN) .......................... 2014 1 0156199

(51) Int. Cl.
*F16K 1/20* (2006.01)
*F16K 31/56* (2006.01)
(Continued)

(52) U.S. Cl.
CPC .............. *F16K 1/20* (2013.01); *F16K 1/2028* (2013.01); *F16K 17/363* (2013.01); *F16K 31/44* (2013.01); *F16K 31/563* (2013.01)

(58) Field of Classification Search
CPC ........ F16K 1/20; F16K 1/2028; F16K 31/563; F16K 31/44; F16K 17/363
(Continued)

(56) References Cited

U.S. PATENT DOCUMENTS 1,156,326 A 10/1915 Stiers
2,266,421 A 12/1941 Griffith
(Continued)

FOREIGN PATENT DOCUMENTS

CN 204164469 U 2/2015
DE 2512464 A1 9/1976

OTHER PUBLICATIONS

International Search Report and Written Opinion of PCT Patent Application No. PCT/US2015/024803, Jul. 6, 2015.
(Continued)

*Primary Examiner* — Marina Tietjen
(74) *Attorney, Agent, or Firm* — Marshall, Gerstein & Borun LLP

(57) ABSTRACT

An emergency shut-off valve includes a valve body defining an inlet, an outlet, a valve port between the inlet and the outlet, and an aperture. A valve assembly is positioned partially within the valve body and extends through the aperture. An actuator assembly is operatively coupled to the valve assembly to move the valve assembly between an open position and a closed position and includes a poppet and a rotatable shaft. The poppet is disposed within the valve body and is moveable between an open position that allows the flow of fluid through the valve body and a closed position that prevents the flow of fluid through the valve body. The shaft is coupled to the poppet and has a retaining member positioned within a slot in an arm of the poppet to prevent the poppet from being removed from the shaft.

7 Claims, 8 Drawing Sheets

(51) Int. Cl.
*F16K 31/44* (2006.01)
*F16K 17/36* (2006.01)

(58) Field of Classification Search
USPC .......................................................... 251/301
See application file for complete search history.

(56) References Cited

U.S. PATENT DOCUMENTS

| | | | |
|---|---|---|---|
| 3,106,220 A | * | 10/1963 | Hose ....................... F16K 15/03 137/514 |
| 3,521,659 A | | 7/1970 | Seger |
| 3,938,541 A | | 2/1976 | Polacheck et al. |
| 5,209,454 A | | 5/1993 | Engdahl et al. |
| 5,454,394 A | | 10/1995 | Moore et al. |

OTHER PUBLICATIONS

"Type N550 D450042T012 Instruction Manual", Apr. 30, 1981, 8 pgs.
Fisher Instructional Manual dated Mar. 2010, "Type N550 Snappy Joe Emergency Shutoff Valves" 8 pages.
Fisher Instruction Manual dated Apr. 1981, "Type N550 Packing Removal/Replacement", 8 pages.
Fisher Manual May 2010, "Fisher Emergency Shutoff Valves—Snappy Joe Shutoff Valves", 2 pages.
"Type N550 Snappy Joe Emergency Shutoff Valve", Aug. 2007, 1 page.
International Preliminary Report on Patentability and Written Opinion for PCT/US2015/024803 dated Oct. 27, 2016.

* cited by examiner

EMERGENCY SHUT-OFF VALVE

CROSS-REFERENCE TO RELATED APPLICATIONS

This application claims priority to Chinese Patent Application No. 201410156199.7, entitled "Emergency Shut-Off Valve" and filed on Apr. 14, 2014, the entire disclosure of which is hereby incorporated by reference herein.

FIELD OF THE DISCLOSURE

This disclosure relates generally to emergency shut-off valves and, more specifically, to emergency shut-off valves with improved gland sealing and ease of assembly and maintenance.

BACKGROUND

Gas distribution systems, in particular natural gas distribution systems, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include some sort of safety device to shut off the flow of gas. Most commonly, emergency shut-off valves are used for this purpose. The emergency shut-off valve is generally disposed upstream of the pressure regulating valve so that the emergency shut-off valve may prevent gas from reaching the pressure regulating valve in the event of a problem. The emergency shut-off valve can be operated manually, or can monitor gas pressure downstream of the pressure regulating valve, to close the valve and cut off the flow of gas to the pressure regulating valve to prevent an uncontrolled leak of gas, such as due to a pressure regulating valve failure or other problem.

Typically, emergency shut-off valves have a poppet or other type of valve plug that is mounted on a rotatable shaft to move the poppet between an open position, which allows the flow of fluid through the valve, and a closed position, which prevents the flow of fluid through the valve. However, in typical emergency shut-off valves, once assembled there is nothing preventing the poppet from sliding off of the shaft during maintenance. Therefore, if the shaft is moved during a maintenance procedure, there is the possibility that the poppet can drop into the valve, or even drop further down into the gas distribution system, which can require the removal of the emergency shut-off valve and cause other problems.

In addition, during assembly and maintenance of an emergency shut-off valve, one end of a torsion spring, which is used to bias the poppet into the closed position, must be aligned with and engage the gland to secure the end of the torsion spring. In typical designs, aligning the end of the torsion spring and ensuring engagement can be difficult when inserting the gland into the housing of the valve.

Finally, most typical emergency shut-off valves use a gasket between an outer surface of the gland and an inner surface of the valve housing to prevent leakage between the gland and housing. However, these gaskets are prone to leakage and problems can be encountered in installing these gaskets, especially if the gaskets need to be installed over threads, which can damage the gasket.

BRIEF SUMMARY OF THE DISCLOSURE

In accordance with one exemplary aspect of the present invention, an emergency shut-off valve includes a valve body defining an inlet, an outlet, a valve port between the inlet and the outlet, and an aperture. A valve assembly is positioned partially within the valve body and extends through the aperture. An actuator assembly is operatively coupled to the valve assembly to move the valve assembly between an open position and a closed position and includes a poppet and a rotatable shaft. The poppet is disposed within the valve body and is moveable between an open position that allows the flow of fluid through the valve body and a closed position that prevents the flow of fluid through the valve body. The shaft is coupled to the poppet and has a retaining member positioned within a slot in an arm of the poppet to prevent the poppet from being removed from the shaft.

In accordance with another exemplary aspect of the present invention, a gland for an emergency shut-off valve includes a generally cylindrical body, a bore formed through the body and sized to receive a rotatable shaft, and a slot formed in a first end of the body. The slot is configured to receive an end of a torsion spring.

In accordance with another exemplary aspect of the present invention, a shaft for an emergency shut-off valve includes a first end, a first polygonal intermediate portion having a hole formed therein, and a retaining member positioned within the hole. The first intermediate portion configured to engage a poppet of the emergency shut-off valve and the retaining member preventing the poppet from being removed from the shaft.

In further accordance with any one or more of the foregoing exemplary aspects of the present invention, an emergency shut-off valve, a gland for an emergency shut-off valve, and/or a shaft for an emergency shut-off valve may further include, in any combination, any one or more of the following preferred forms.

In one preferred form, the shaft comprises a polygonal intermediate portion, the retaining member disposed in the intermediate portion of the shaft, and the poppet comprises a polygonal aperture configured to receive and engage the intermediate portion of the shaft.

In another preferred form, the retaining member comprises at least one of a spring pin, a screw, a pin, or a clip.

In another preferred form, the emergency shut-off further comprises a gland including a generally cylindrical body, a bore formed through the body and sized to receive the shaft, and a slot formed in a first end of the body, the slot configured to receive an end of a torsion spring.

In another preferred form, the emergency shut-off valve further comprises an O-ring positioned within a recess surrounding the aperture at an outer surface of the valve body, and a flange extending from an outer surface of the gland. The flange engages the O-ring to provide a seal between the gland and the valve body.

In another preferred form, the torsion spring includes a cylindrical portion sized to receive the shaft, a first end engaging the poppet, and a second end engaging a gland, to bias the poppet into the closed position.

In another preferred form, an outer surface of a second end of the gland defines at least one arcuate surface and at least one planar surface, the at least one arcuate surface and the at least one planar surface configured to align and mate with a recess formed in a retainer secured to the valve body.

In another preferred form, the shaft further comprises a second end configured to engage an actuator of the emergency shut-off valve.

DETAILED DESCRIPTION

The example emergency shut-off valve described herein offers better lifecycle, easier assembly and maintenance, and improved gland sealing over typical emergency shut-off valves. Improved gland sealing can be achieved by the use of an O-ring positioned in a chamfer at the end of the valve body that engages a flange on the gland, rather than positioning a gasket between an outer surface of the gland and an inner surface of an aperture in the valve body. In addition, assembly and maintenance can be made easier by providing a slot in an end of the gland to receive the end of the torsion spring, rather than a hole, to simplify assembly of the valve. Furthermore, a spring pin can be placed on the shaft to prevent the poppet from dropping into the valve body or falling downstream of the valve body during maintenance, which can require the valve to be taken out of the piping system and/or cause additional problems.

Figure 1:
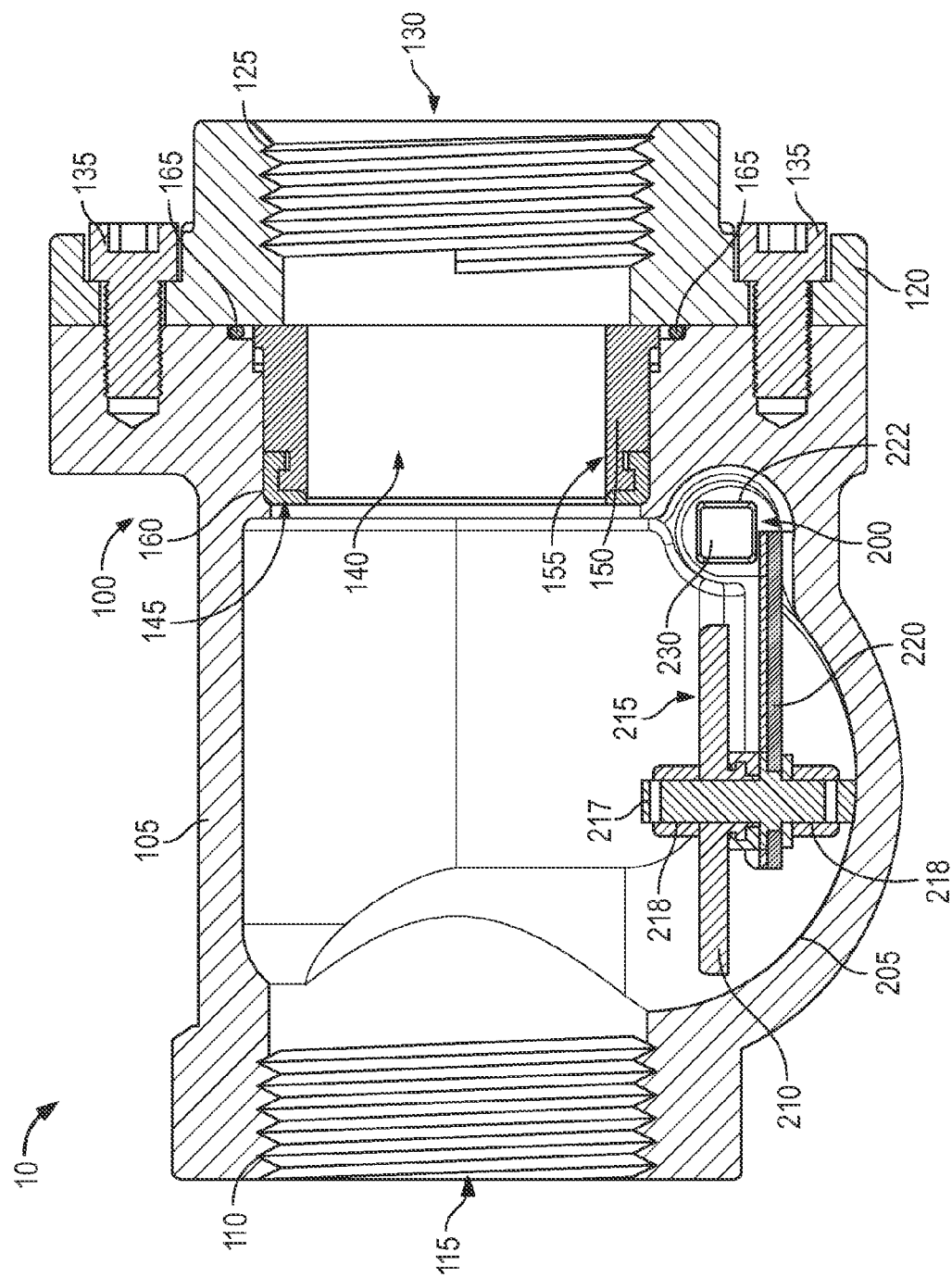
FIG. 1 is a side cross-sectional view of an example emergency shut-off valve.
Figure 2:
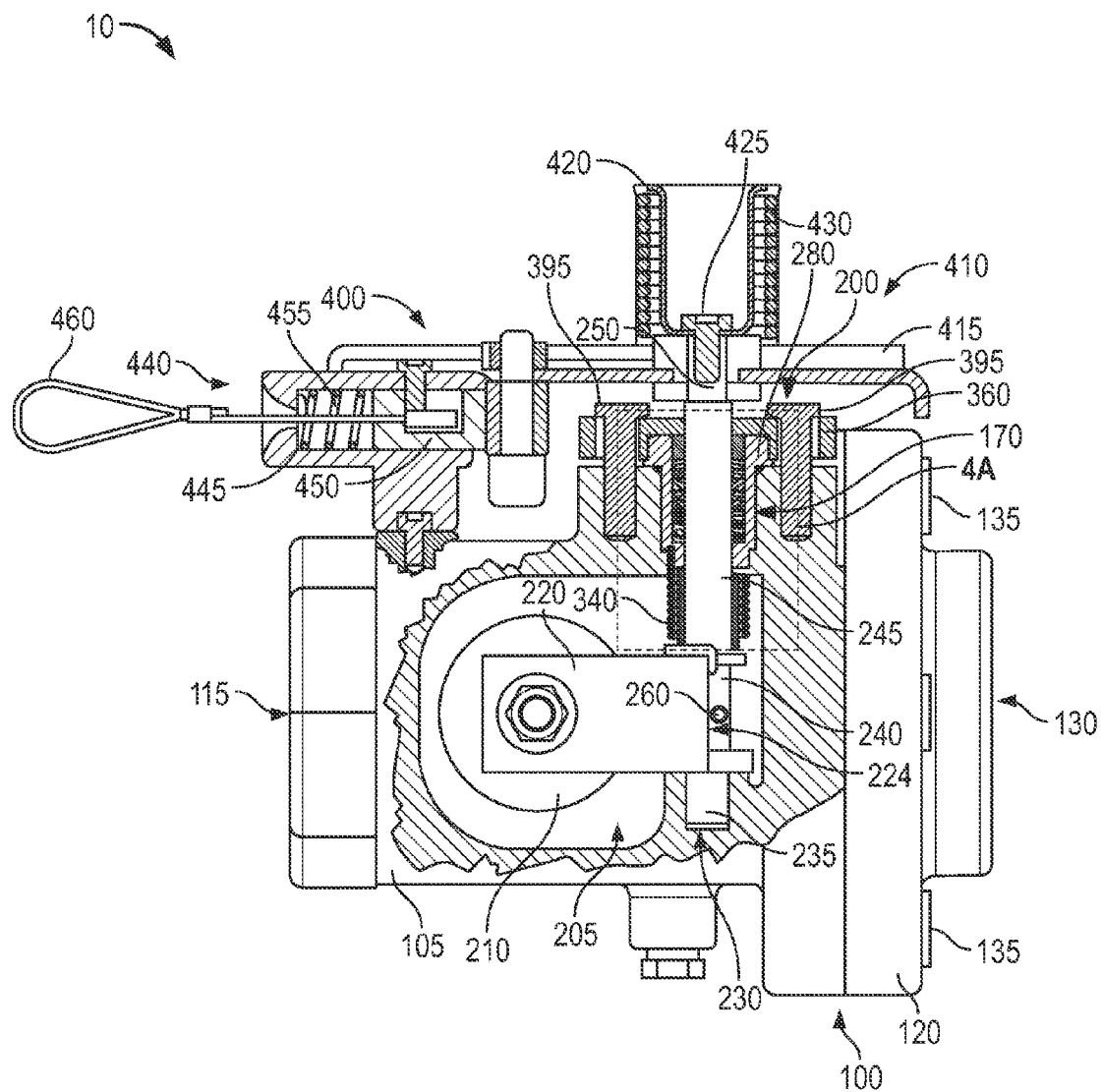
FIG. 2 is a bottom partial cross-sectional view of the example emergency shut-off valve of FIG. 1.

Referring to FIGS. 1 and 2, an example emergency shut-off valve 10 generally includes a valve body 100, a valve assembly 200, and an actuator assembly 400. Valve body 100 includes a first portion 105 and a second portion 120 secured to first portion 105 with threaded members 135. An O-ring 165 can be positioned between first portion 105 and second portion 120 to prevent leakage from valve body 100. First portion 105 has a threaded aperture 110 that defines an inlet 115, second portion 120 has a threaded aperture 125 that defines an outlet 130, and a valve port 140 is located between the inlet 115 and the outlet 130. In the example shown, an insert 150 is positioned within first portion 105 of valve body 100 and includes a bore 155 that defines the valve port 140. A seal 160 is secured to an end of insert 150 to provide a seating surface 145 to engage a sealing surface 215 of a poppet 205 of the valve assembly 200, as described in more detail below. An aperture 170 can also be formed through a sidewall of first portion 105 to receive valve assembly 200 and a chamfer 175 (FIGS. 4A and 4B), or other channel or recess, can be formed at an end of aperture 170 to receive an O-ring 330 to provide a seal between first portion 105 of valve body 100 and a gland 280 of valve assembly 200.

Referring to FIGS. 2-4B, valve assembly 200 generally includes poppet 205, shaft 230, gland 280, torsion spring 340, and retainer 360. Poppet 205 includes valve plug 210 that defines sealing surface 215, which engages seating surface 145 of valve port 140 when valve 10 is in a closed position. A threaded member 217 extends through a hole formed in valve plug 210 and through a hole in arm 220 to connect poppet 205 to arm 220 with nuts 218. Arm 220 has a polygonal aperture 222, to receive a portion of shaft 230, and a slot 224 intersecting aperture 222, to provide access to the portion of shaft 230 and to receive a first end 350 of torsion spring 340. In the example shown, aperture 222 is square and receives a square portion of shaft 230 such that poppet 205 rotates with shaft 230.

As can best be seen in FIGS. 3 and 8-11, shaft 230 has a generally cylindrical first end 235, a polygonal first intermediate portion 240 configured to receive and engage arm 220 of poppet 205 through aperture 222, a generally cylindrical second intermediate portion 245 configured to receive torsion spring 340 and gland 280, and a polygonal second end 250 configured to engage a portion of actuator assembly 400. In the example shown, first intermediate portion 240 of shaft 230 is square and is received in aperture 222 of poppet 205 to operatively couple poppet 205 to shaft 230 such that poppet 205 rotates about shaft 230 as shaft 230 is rotated. A hole 255 is formed in first intermediate portion 240 of shaft 230 and is configured to receive a retaining member 260, such as a spring pin, screw, pin, clip, or other retaining device, which extends into slot 224 in arm 220 and prevents poppet 205 from sliding off shaft 230 during assembly, operation, or maintenance of emergency shut-off valve 10. Second intermediate portion 245 of shaft 230 is inserted through and rotatable within torsion spring 340 and gland 280 and, as can best be seen in FIG. 4A, a follower 265 and packing 270 can be positioned between shaft 230 and gland 280 to allow rotation of and prevent leakage between shaft 230 and gland 280. Spring 275 can also be positioned within gland 280 and around shaft 230 to compress packing 270.

Referring to FIGS. 3-6, gland 280 has a generally cylindrical body 285 sized to fit within aperture 170 in valve body 100 and a bore 290 through body 285, sized to receive second intermediate portion 245 of shaft 230. One or more cavities 295 (FIG. 4A) can also be formed within body 285 to accommodate follower 265, packing 270, and/or spring 275 as required. First end 300 of body 285 can have a slightly reduced diameter and defines one or more slots 305, which are configured to receive and secure a second end 355 of torsion spring 340. Providing slots 305 in the first end 300 of gland 280 simplifies the assembly and maintenance of valve 10 as gland 280 can be easily aligned with second end 355 of torsion spring 340. A flange 310 extends radially from an outer surface of body 285 proximate the second end 315 of body 285 and is configured to engage O-ring 330 and provide a seal between first portion 105 of valve body 100 and gland 280. Second end 315 of gland 280 has two arcuate outer surfaces 320 and two planar outer surfaces 325, which are configured to mate with surfaces 385, 390 of recess 380 in retainer 360.

Figure 3:
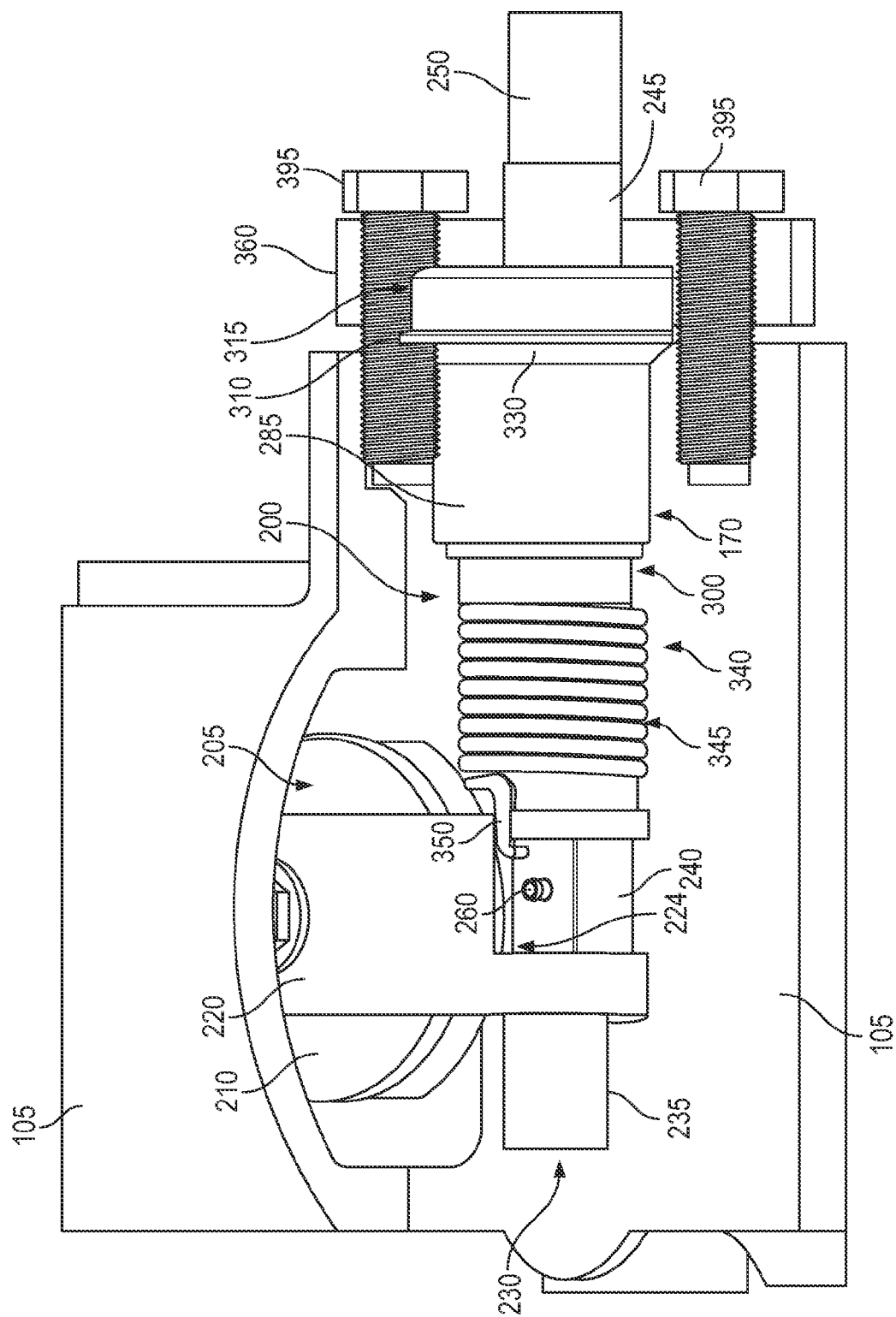
FIG. 3 is an enlarged partial top view of the example emergency shut-off valve of FIG. 2 with a portion of the body of the valve removed.
Figure 4A:
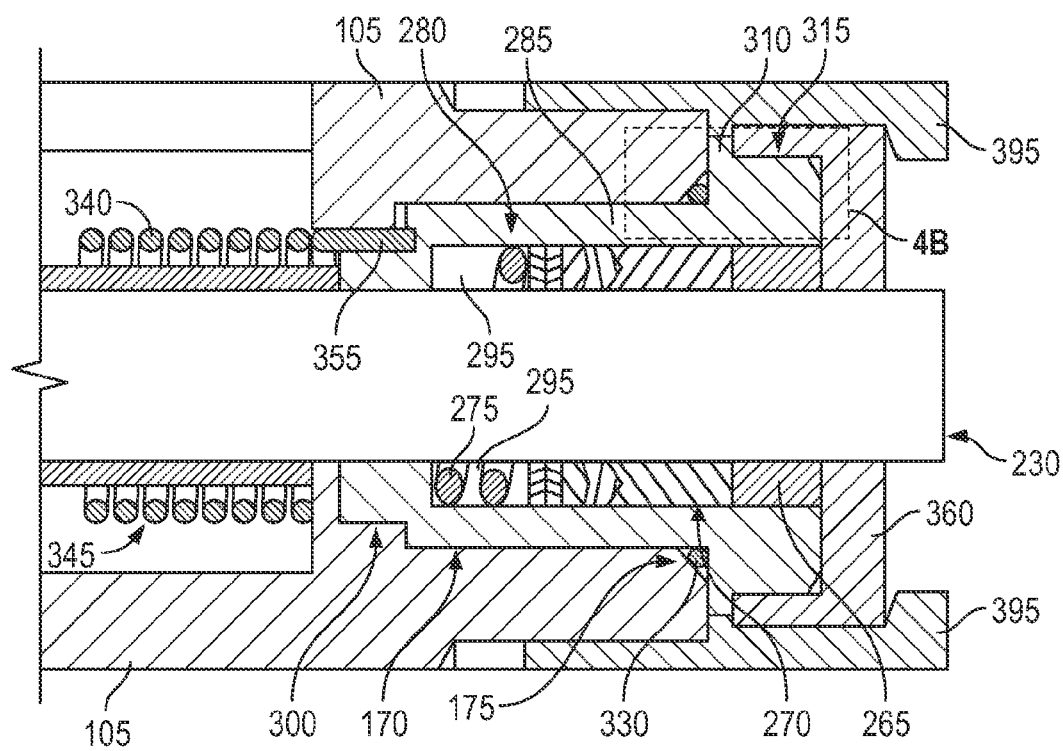
FIG. 4A is an enlarged view of a portion of FIG. 3.
Figure 4B:
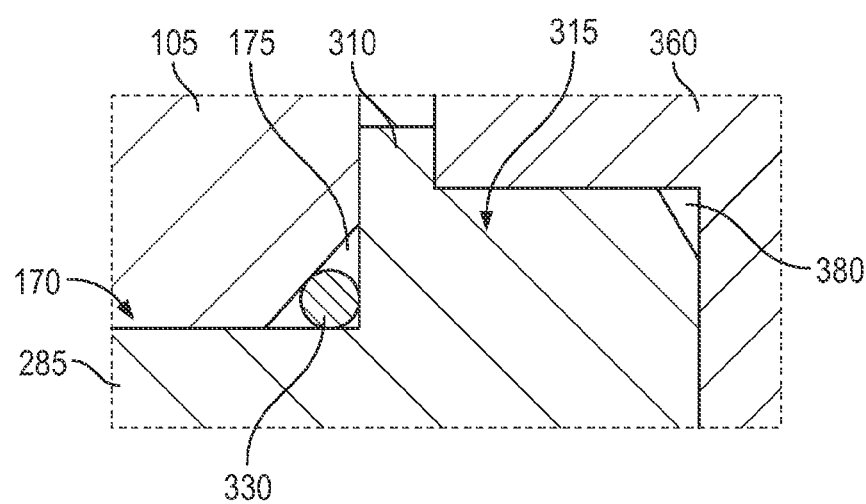
FIG. 4B is an enlarged view of a portion of FIG. 4A.
Figure 5:
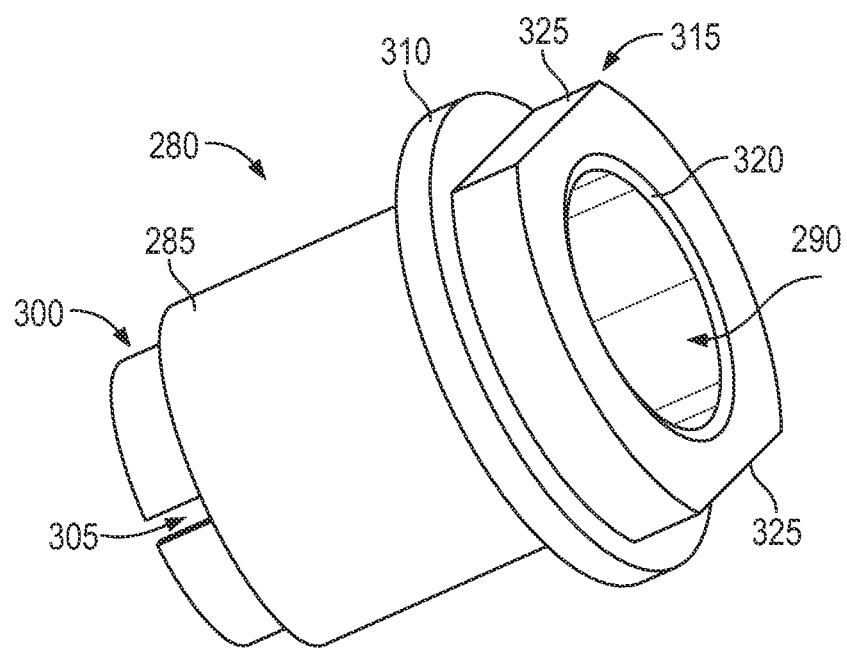
FIG. 5 is a perspective view of an example gland for an emergency shut-off valve.
Figure 6:
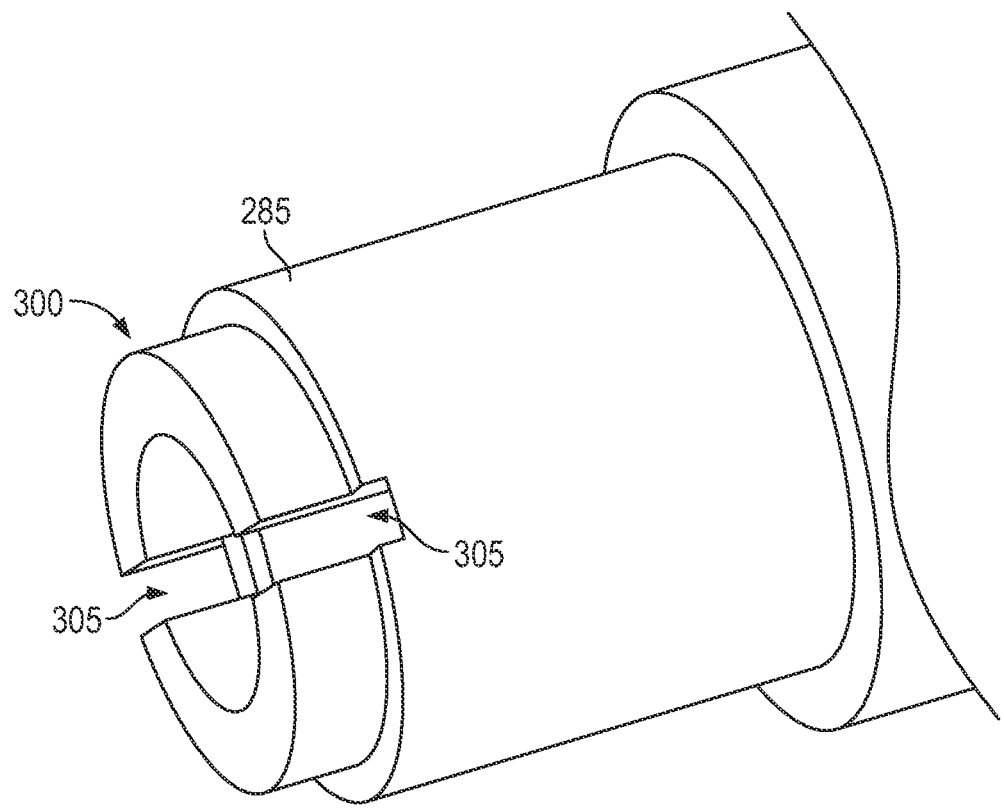
FIG. 6 is an enlarged perspective view of an end of the example gland of FIG. 5.
Figure 7:
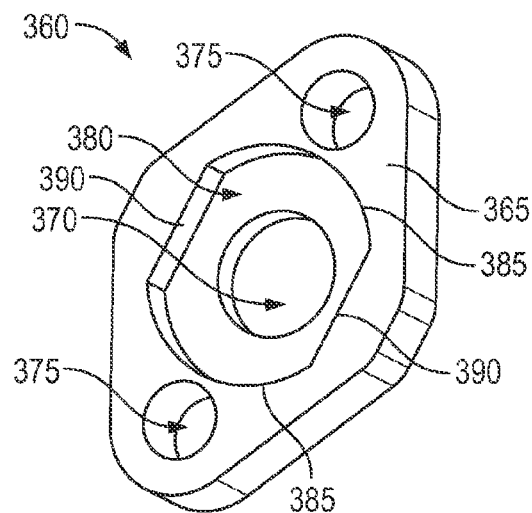
FIG. 7 is a perspective view of an example retainer for an emergency shut-off valve.
Figure 8:
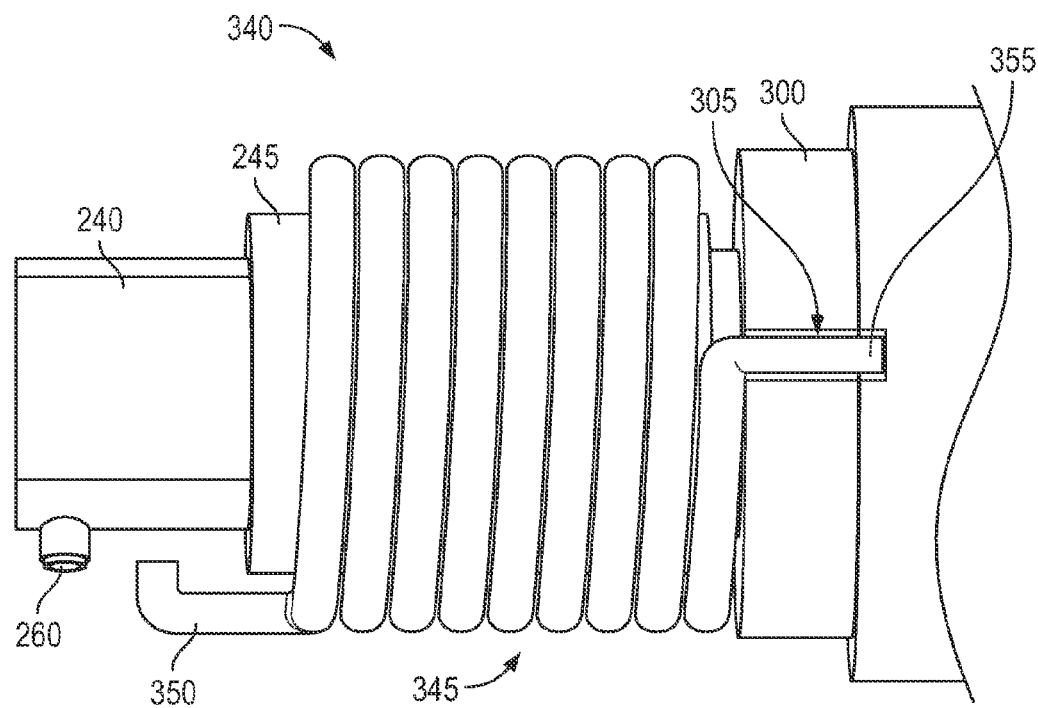
FIG. 8 is an enlarged, partial, side view of the shaft, gland, and torsion spring of FIG. 2.
Figure 9:
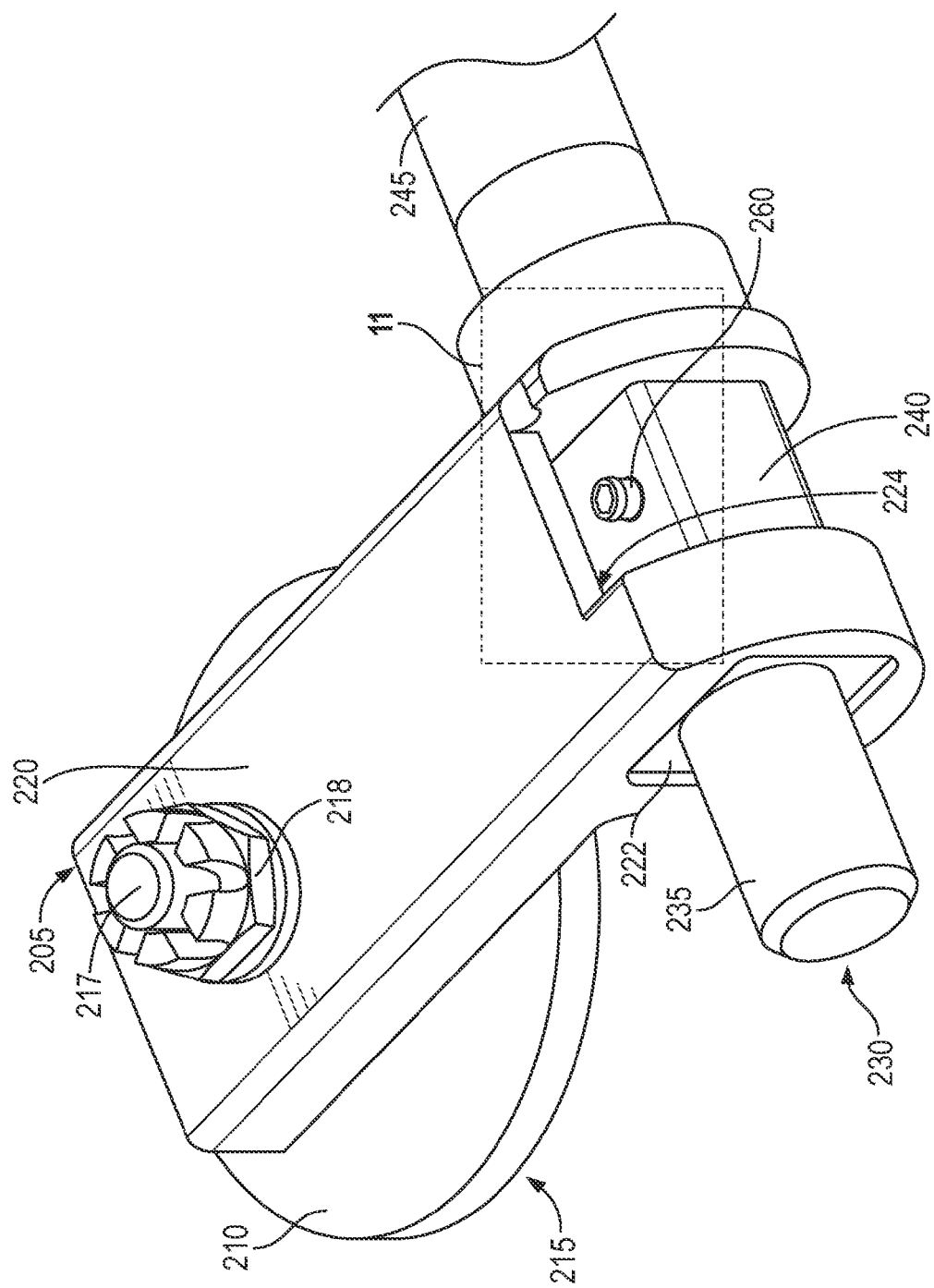
FIG. 9 is an enlarged perspective view of the shaft, poppet, and spring pin of FIG. 2.
Figure 10:
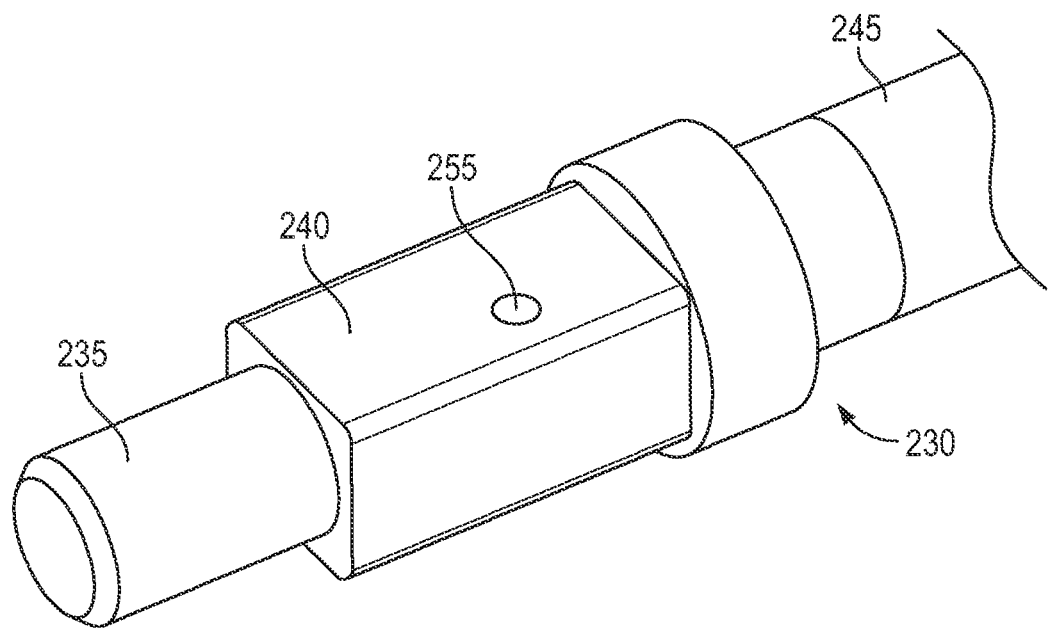
FIG. 10 is an enlarged perspective view of the shaft of FIG. 9.
Figure 11:
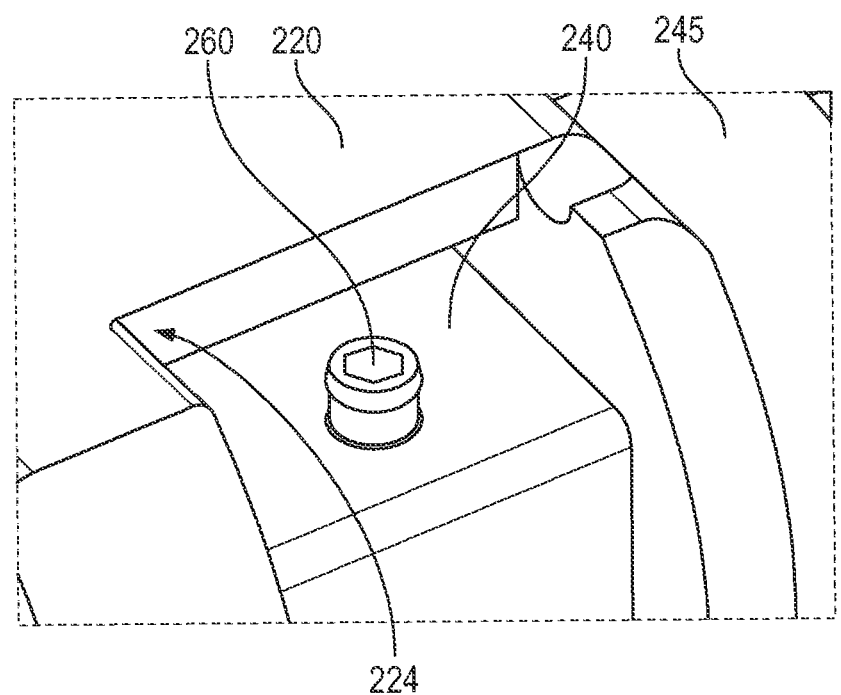
FIG. 11 is an enlarged perspective view of a portion of FIG. 9.

As shown in FIGS. 3, 4A, and 8, torsion spring 340 has a generally cylindrical portion 345 that is positioned over shaft 230. A second end 355 of torsion spring 340 extends from one end of cylindrical portion 345 and is positioned in a slot 305 in gland 280, which keeps second end 355 stationary as shaft 230 rotates and poppet 205 moves. A first end 350 of torsion spring 340 extends from the opposite end of cylindrical portion 345 and is positioned within slot 224 in arm 220 of poppet 205 to bias poppet 205 into a closed position where sealing surface 215 of poppet 205 engages seating surface 145 of valve port 140. Alternatively, first end 350 of torsion spring 340 could engage arm 220 of poppet 205 in other manners, such as resting in a groove, inserted into a hole, etc., as long as torsion spring 340 biases poppet 205 into a closed position. As shaft 230 is rotated and poppet 205 is moved from the closed position and into an open position, second end 355 of torsion spring 340 remains stationary in slot 305 of gland 280 and first end 350 of torsion spring 340 will move with poppet 205, thereby loading torsion spring 340.

Referring to FIGS. 3-4B and 7, retainer 360 has a generally planar body 365 that has an aperture 370 sized to receive shaft 230 and a plurality of holes 375 sized and positioned to receive threaded members 395 to secure retainer 360 to first portion 105 of valve body 100. On one surface of retainer 360 there is a recess 380 having two arcuate surfaces 385 and two planar surfaces 390, which correspond to the arcuate and planar surfaces 320, 325 of second end 315 of gland 280. Alternatively, recess 380 of retainer 360 and second end 315 of gland 280 could be generally cylindrical with a single planar surface, could be polygonal, or could be any other geometry desired to provide better positioning of gland 280 and retainer 360.

An actuator is operatively coupled to second end 250 of shaft 230 to rotate shaft 230 and move poppet 205 between open and closed positions. Actuators that can be to trigger and reset emergency shut-off valves are well known to those skilled in the art. For example, the actuator could be a manual actuator, such as the manual actuator on the Fisher® N550 Emergency Shut-Off Valve, it could be an air-close actuator, such as the Fisher® P327D, or it could be an air open-close actuator, such as the Fisher® P539A. In the example shown in FIG. 2, actuator assembly 400 is a manual actuator and generally includes a handle assembly 410 and a latch assembly 440.

Handle assembly 410 includes a handle 415 mounted on second end 250 of shaft 230 and a mandrel 420 that is positioned at the distal end of second end 250 of shaft 230. Handle 415 and mandrel 420 are secured to shaft 230 by a threaded member, such as bolt 425. Torsion spring 430 is positioned around mandrel 420 and has one end secured to handle 415 and a second end that engages latch assembly 440. Torsion spring 430 biases handle 415 into a closed position, where poppet 205 is also in a closed position.

Latch assembly 440 includes a latch block 445 that is secured to valve body 100. Plunger 450 is moveably disposed within latch block 445 such that plunger 450 is moveable longitudinally within latch block 445 and a portion of plunger 450 protrudes from and end of latch block 445 to a position where an end of plunger 450 engages handle 415 when handle 415 is in an open position. A resilient member, such as a spring 455, is positioned within latch block 445 and adjacent plunger 450 to bias plunger 450 away from latch block 445. Cable 460 is secured to plunger 450 and extends through an opening in latch block 445 so that cable 460 is accessible to a user.

In operation, torsion springs 430, 340 bias handle 415 and poppet 205 into a closed position, thereby seating sealing surface 215 of poppet 205 against seating surface 145 of valve port 140 and preventing the flow of fluid through emergency shut-off valve 10. To reset emergency shut-off valve 10, handle 415 is rotated to an open position, thereby loading torsion spring 430, until a latching portion of handle 415 engages plunger 450 and holds handle 415 in the open position. Rotating handle 415 into the open position also rotates shaft 230, which moves poppet 205 into an open position and loads torsion spring 340. Plunger 450 holds handle 415 in the open position until emergency shut-off valve 10 is triggered. To trigger emergency shut-off valve 10, cable 460 is pulled, which pulls plunger 450 into latch block 445 against the force of spring 455. As plunger is pulled into latch block 445 it disengages from handle 415 and torsion spring 430 rotates handle 415 back to the closed position. Rotating handle 415 into the closed position also rotates shaft 230, which moves poppet into the closed position and closing emergency shut-off valve 10.

While various embodiments have been described above, this disclosure is not intended to be limited thereto. Variations can be made to the disclosed embodiments that are still within the scope of the appended claims.

What is claimed is:

1. An emergency shut-off valve, comprising:
    a valve body defining an inlet, an outlet, a valve port between the inlet and the outlet, and an aperture;
    a valve assembly positioned partially within the valve body and extending through the aperture; and
    an actuator assembly operatively coupled to the valve assembly to move the valve assembly between an open position and a closed position; wherein the valve assembly comprises:
    a poppet disposed within the valve body and moveable between an open position that allows the flow of fluid through the valve body and a closed position that prevents the flow of fluid through the valve body, the poppet comprising an arm having a slot formed therethrough;
    a rotatable shaft coupled to the poppet, the shaft comprising a retaining member positioned within the slot of the poppet to prevent the poppet from being removed from the shaft;
    a gland including a generally cylindrical body, a bore formed through the body and sized to receive the shaft, a slot formed in a first end of the body and configured to receive an end of a torsion spring, a flange extending from an outer surface of the gland, and an outer surface of a second end of the gland defining at least one arcuate surface and at least one planar surface, the at least one arcuate surface and the at least one planar surface aligning with and mating with a recess formed in a retainer secured to the valve body; and
    an O-ring positioned within a recess surrounding the aperture of the valve body at an outer surface of the valve body; wherein
    the flange of the gland engages the O-ring to provide a seal between the gland and the valve body.

2. The emergency shut-off valve of claim 1, wherein:
    the shaft comprises a polygonal intermediate portion, the retaining member disposed in the intermediate portion of the shaft; and
    the poppet comprises a polygonal aperture configured to receive and engage the intermediate portion of the shaft.

3. The emergency shut-off valve of claim 1, wherein the retaining member comprises at least one of a spring pin, a screw, a pin, or a clip.

4. The emergency shut-off valve of claim 1, wherein the torsion spring includes a cylindrical portion sized to receive the shaft, a first end engaging the poppet, and a second end engaging a gland, to bias the poppet into the closed position.

5. A gland for an emergency shut-off valve, the gland comprising:
   a generally cylindrical body;
   a bore formed through the body and sized to receive a rotatable shaft; and
   a slot formed in a first end of the body, the slot receiving an end of a torsion spring of the emergency shut-off valve; wherein
   an outer surface of a second end of the gland defines at least one arcuate surface and at least one planar surface, the at least one arcuate surface and the at least one planar surface aligning with and mating with a recess formed in a retainer secured to a valve body of the emergency shut-off valve.

6. The gland of claim 5, further comprising a flange extending from an outer surface of the body, the flange configured to engage an O-ring positioned within a recess in a valve body of the emergency shut-off valve to provide a seal between the gland and the valve body.

7. The gland of claim 5, wherein the torsion spring includes a cylindrical portion sized to receive a rotatable shaft, a first end engaging a poppet of the emergency shut-off valve, and a second end engaging a gland, to bias the poppet into a closed position.

* * * * *